United States Patent

[11] 3,548,856

[72] Inventor Isadore Vant
 Santa Clara, Calif.
[21] Appl. No. 782,312
[22] Filed Dec. 9, 1968
[45] Patented Dec. 22, 1970
[73] Assignee Vant Manufacturing, Co.
 San Jose, Calif.
 a corporation of California

[54] PRESSURE RELIEF VALVE
 11 Claims, 3 Drawing Figs.
[52] U.S. Cl...................................................... 137/210,
 62/51; 222/4; 137/588
[51] Int. Cl...................................................... F17c 7/02
[50] Field of Search........................................... 137/588,
 587, 210; 62/51; 222/4

[56] References Cited
 UNITED STATES PATENTS
 2,226,810 12/1940 Ensign............................ 62/51

*Primary Examiner*—Alan Cohan
*Attorney*—Jack M. Wiseman

ABSTRACT: A valve for relieving the pressure of a liquid flowing under air pressure, which valve is constructed of a housing defining a valve chamber with inlet and outlet conduits, and a port for admitting into the chamber a mixture of vapors of the liquid and the pressurizing air. A valve mechanism is provided for controlling the flow of materials into the outlet conduit and has a first setting for the reception by the outlet conduit of liquid from the inlet conduit, and a second setting for the reception by the outlet conduit of the air-vapor mixture. Pressure-sensitive valve control means normally maintain the valve mechanism in its first setting, and provide for the second setting of the valve mechanism when the pressure of the air-vapor mixture reaches a predetermined level.

PATENTED DEC 22 1970

3,548,856

INVENTOR.
Isadore Vant
BY Jack M. Wiseman
ATTORNEY 3,548,856

PRESSURE RELIEF VALVE

BACKGROUND OF THE INVENTION

The present invention relates to the handling of pressurized liquids, and more particularly to a valve for maintaining a safe pressure in the transmission of a liquid pressurized by air.

In the prior art, it has been conventional to handle a liquid to be transmitted under pressure, under conditions which may produce an increase in the temperature of such liquid. When such a temperature increase has occurred, increased vaporization of the liquid has been the result. Since the liquid has usually been maintained in a closed system (i.e., of constant volume), the increased vaporization has tended to produce a proportionate increase in liquid pressure, and a resultant increase in the rate of liquid flow. Such increases in the liquid pressure and rate of liquid flow have often produced a further temperature increase. A dangerous cycle, possibly leading to an explosion may result therefrom.

Problems with respect to the handling of pressurized liquids have arisen in connection with pressurized liquid fuel burners, cooking equipment and lanterns. In the use of a pressurized liquid fuel burner, the ambient temperature increase resulting from the use of the burner has tended to produce increased vaporization, and consequent increased pressure of the liquid fuel employed. When such increase in fuel pressure has occurred, an increase in the rate of flow of the fuel, and in the rate of fuel combustion, has resulted. The increased rate of fuel combustion has usually created a further increase in the ambient temperature, with ensuing increase in the vaporization, pressure, and rate of flow of the fuel. A still further increase in the rate of fuel combustion, and in the ambient temperature, has then been the result. The cycle of increases in ambient temperature, and consequent increases in the rate of flow of the fuel, has been dangerous, possibly leading to explosion-producing conditions.

SUMMARY OF THE INVENTION

The present invention provides a valve, the use of which serves to overcome the above-discussed problem existing in the prior art, with respect to the handling of pressurized liquids. The valve of the invention is designed for use in connection with the transmission of a liquid pressurized by air or a suitable gas or a suitable vapor. Such valve serves to transmit the pressurized liquid therethrough, so long as the pressure of transmission remains at a safe level. The valve of the invention furthermore, serves to interrupt the flow of the liquid when an unsafe pressure condition is encountered; and to correct such unsafe pressure condition.

BRIEF DESCRIPTION OF THE DRAWINGS

The advantages of the present invention will become apparent to one skilled in the art, from the following description, when read in conjunction with the accompanying drawings, in which.

DESCRIPTION OF THE PREFERRED EMBODIMENT

Figures 1, 2, 3:
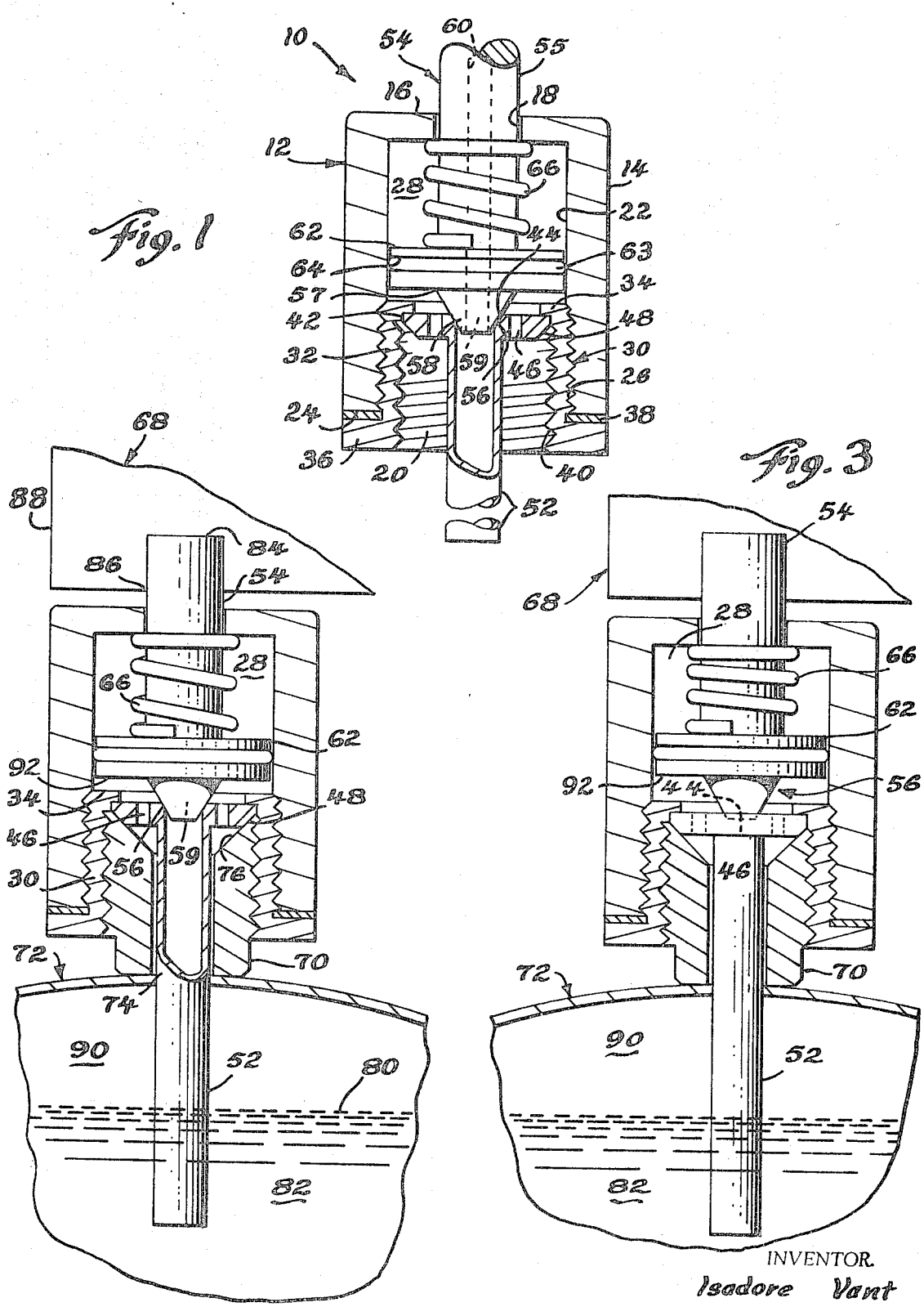
FIG. 1 is a medial cross-sectional view of a valve constructed in accordance with the invention.
FIG. 2 is a view similar to FIG. 1, but on a reduced scale, the valve being shown in an operative position for the conduction of pressurized liquid to a fuel burner.
FIG. 3 is a view similar to FIG. 2, the valve being shown in an operative position for interrupting the flow of liquid to the burner, for relief of an unsafe pressure condition.

In FIG. 1, there is shown a pressure relief valve 10, constructed in accordance with the invention. The valve 10 provides a housing 12, which is of hollow, cylindrical shape. The housing 12 is formed of a side wall 14, closed at one end thereof by a flat end wall 16. The end wall 16 is formed with a central aperture 18. The housing 12 is open at its opposite end, to provide a port 20. A smooth inner cylindrical surface 22 of the side wall 14 is formed, adjacent the terminal end 24 thereof, with screw threads 26. The housing 12 defines a cylindrical valve chamber 28.

Mounted within the chamber 28, and extending through the port 20, is an adapter member 30, of generally hollow cylindrical shape. The member 30 is externally threaded, as seen at 32, for engagement with the threads 26 of the wall surface 22. At its end within the chamber 28, the member 30 is formed with an axially inwardly projecting flange 34. At its opposite end, the member 30 is formed with an outwardly projecting flange 36, which is sealed by means of a gasket 38 to the surface of the terminal end 24 of the wall 14. The member 30 is internally threaded, as seen at 40.

Supported within the member 30, and in abutment with the flange 34, is a plate 42, formed with a central orifice 44. The plate 42 is also formed with a plurality of transverse passageways 46. The plate 42 is beveled at its rearward corner, as seen at 48. Secured to the plate 42, and aligned with the orifice 44, is the discharge end 50 of a liquid inlet conduit 52, which extends through the port 20.

An outlet conduit 54 is provided for the chamber 28. The conduit 54, having a relatively thick wall 55, extends from the chamber 28, through the aperture 18.

Associated with the inlet conduit 52 and the outlet conduit 54 is a valve mechanism 56. The orifice 44 in the plate 42 is designed to serve as a valve seat, as part of the mechanism 56. Integral with the conduit 54, and located at the inner, or receiving end 57 thereof, is a valve element 58, designed for cooperation with the seat 44. The valve element 58 provides an axial passageway 59, which communicated with the passageway 60 of the conduit 54.

Means are provided for the control of the setting of the valve mechanism 56. Such control means include a piston member 62, which is mounted on the wall 55 of the outlet conduit 54, adjacent the valve element 58. An O-ring 63, of conventional design, is positioned within a circumferentially extending groove 64 formed in the piston member 62, and serves to seal the member 62 to the wall surface 22 in conventional manner.

The control means for the valve mechanism 56 also include a spring 66, mounted within the chamber 28 and surrounding the outlet conduit 54.

The spring 66 is compressed between the end wall 16 and the piston member 62, and serves to resiliently maintain the outlet conduit 54 in the position shown in FIG. 1, in which the valve element 58 is seated within the seat 44.

The manner of operation of the valve 10 will be described with particular reference to FIGS. 2 and 3. In FIG. 2, the valve 10 is shown mounted in position for use in conjunction with the operation of a liquid fuel burner, now shown, of conventional design. The housing 12, is secured, by means of the member 30, to an externally threaded bushing 70, mounted on a liquid fuel storage tank 72. The bushing 70 is positioned in alignment with an outlet port 74 for the tank 72. The bushing 70 is formed with a beveled forward end surface 76. The beveled surface 76 bears against the beveled rearward corner 48 of the plate 42, for maintaining the plate 42 tightly in its position of abutment with the flange 34. The outer end 78 of the inlet conduit 52 is located beneath the surface 80 of a body of liquid fuel 82, stored in the tank 72. The outlet conduit 54, adjacent the outer end 84 thereof, projects through a port 86 in the wall 88 of a vaporizer or generator 68. Suitable openings are formed in an annular section in the top wall of the tank 72 surrounding the inlet conduit 52 to permit the flow of air or vapor from the air space 90 through the top wall of the tank 72 when the valve 56 opens.

During operation of the burner, now shown, the liquid fuel 82 is pressurized by the pumping of air, in conventional manner, into the airspace 90 in the tank 72. The liquid fuel 82 is thus forced through the inlet conduit 52, the passageway 59 of the valve element 58, and the passageway 60 of the conduit 54, for introduction into the vaporizer or generator 68.

During the burning of the fuel 82 in the burner, not shown, a certain amount of vaporization takes place from the body of liquid fuel 82 in the tank 72. The vapors thus produced pass into the air space 90, and become intermixed with the pressurizing air. The mixture of vapors and pressurizing air is admitted into the valve chamber 28, through the bushing 70, and the passageways 46 in the plate 42. Such air-vapor mixture exerts pressure upon the downstream surface 92 of the piston member 62. However, the pressure exerted by the spring 66 on the piston member 62 is sufficient to counteract the pressure exerted on the surface 92, as long as the latter pressure is at a safe level. The valve mechanism 56 is thus normally maintained in its setting shown in FIG. 2, for conduction of the liquid fuel 82 through the conduit 54 and into the vaporizer or generator 68.

The heat given off by the burner, not shown, during the operation thereof, will produce an ambient temperature increase. As a result, an increase in the rate of vaporization of the liquid fuel 82 into the airspace 90 will take place. An increase in the pressure in the air space 90, and a corresponding increase in the pressure exerted upon the liquid fuel 82, will be the consequence. Because of such pressure increase, the liquid fuel 82 will flow at an increased rate through the conduits 52 and 54, and into the vaporizer or generator 68. At the same time, the air-vapor mixture conducted through the bushing 70 will exert increased pressure on the surface 92 of the piston member 62.

The spring 66 is designed to yield to the increased pressure exerted by the air-vapor mixture on the surface 92, when such pressure reaches an unsafe level. When an unsafe pressure level is reached, the air-vapor mixture will force the piston member 62 to move in an upstream direction, against the urgency of the spring 66. As a consequence thereof, the outlet conduit 54, will be moved into the position shown in FIG. 3. At the same time, the valve element 58 will be removed from the seat 44.

When the valve mechanism 56 has the setting shown in FIG. 3, the liquid fuel 82 will no longer be conducted into the vaporizer or generator 68. Any of the liquid fuel 82 present in the conduit 52 will return to the reservoir of fuel 82 in the tank 72. At the same time, the air-vapor mixture in the chamber 28 will pass through the outlet conduit 54 and into the vaporizer or generator 68. Such air-vapor mixture will continue to flow through the conduit 54 until the pressure of the airspace 90 has been reduced to a safe level, permitting the spring 66 to return the valve mechanism 56 to the normal setting shown in FIG. 2. When the valve mechanism 56 has been returned to such normal setting, flow of the liquid fuel 82 into the vaporizer or generator 68, in the manner previously described, will be resumed.

During the period of time that the air-vapor mixture is conducted to the vaporizer or generator 68, operation of the latter may ordinarily be continued. The air-vapor mixture will usually be rich enough to assure substantially normal operation of the vaporizer or generator 68.

If desired, a diaphragm, (not shown) constructed of resilient material, may be substituted for the piston member 62. Such diaphragm may be of conventional structure, nand secured at its circumferential surface, in conventional manner, to the surface 22.

The use of the valve 10 of the invention serves to overcome the problems inherent in the methods known in the prior art, for transmitting pressurized liquids under conditions which involve an increase in the temperature of such liquids. Thus, the valve 10, by discontinuing the transmission of a pressurized liquid when the pressure has reached an unsafe level, and relieving the unsafe pressure, serves to prevent the development of a dangerous cycle of temperature and pressure increases.

While reference to air is made herein, it is to be expressly understood that a gaseous or vaporous substance may be employed equally as well.

It is to be understood that modifications and variations of the embodiment of the invention disclosed herein may be resorted to without departing from the spirit of the invention and the scope of the appended claims.

I claim:

1. A valve for relieving the pressure of a liquid flowing under air pressure, said valve comprising:
    a. a housing defining a valve chamber, said housing being formed with a port for admitting into said chamber a mixture of vapors of said liquid and the pressurizing air;
    b. a liquid inlet conduit entering said chamber;
    c. an outlet conduit for said chamber;
    d. a valve mechanism for controlling flow into said outlet conduit and having a first setting for the reception by said outlet conduit of liquid from said inlet conduit, said valve mechanism having a second setting for reception of said outlet conduit of said air-vapor mixture; and
    e. a pressure sensitive valve control means located within said chamber for normally maintaining said first setting of said valve mechanism, said control means providing said second setting of said valve mechanism when the pressure of said mixture reaches a predetermined level, said port being provided at one end of said chamber, said inlet conduit entering said chamber at said one end, said outlet conduit being located at the opposite end of said chamber, said inlet conduit enters said chamber through said port.

2. A valve in accordance with claim 1, in which said housing is adapted at said one end for threaded connection to a container of said liquid under pressure.

3. A valve in accordance with claim 1, in which said valve mechanism provides a valve seat associated with said inlet conduit, and a valve element mounted on said outlet conduit and cooperative with said valve seat.

4. A valve in accordance with claim 1, in which said valve control means provide a resiliently supported member, positioned in the path of movement of said air-vapor mixture.

5. A valve in accordance with claim 4, in which said resiliently supported member is a piston member.

6. A valve for relieving the pressure of a liquid flowing under air pressure, said valve comprising:
    a. a housing defining a valve chamber, said housing being formed with a port for admitting into said chamber a mixture of vapors of said liquid and the pressurizing air;
    b. a liquid inlet conduit entering said chamber;
    c. an outlet conduit for said chamber;
    d. a valve mechanism for controlling flow into said outlet conduit and having a first setting for the reception by said outlet conduit of liquid from said inlet conduit, said valve mechanism having a second setting for reception of said outlet conduit of said air-vapor mixture; and
    e. a pressure-sensitive valve control means located within said chamber for normally maintaining said first setting of said valve mechanism, said control means providing said second setting of said valve mechanism when the pressure of said mixture reaches a predetermined level, said valve mechanism provides a valve seat associated with said inlet conduit, and a valve element mounted on said outlet conduit and cooperative with said valve seat, said inlet conduit provides a discharge end within said chamber, a plate being mounted within said chamber and secured to said discharge end, said plate being formed with an aperture providing said valve seat.

7. A valve in accordance with claim 6, in which said plate is formed with a plurality of passageways for directing said air-vapor mixture into contact with said valve control means.

8. A valve for relieving the pressure of a liquid flowing under air pressure, said valve comprising:
    a. a housing defining a valve chamber, said housing being formed with a port for admitting into said chamber a mixture of vapors of said liquid and the pressurizing air;
    b. a liquid inlet conduit entering said chamber;
    c. an outlet conduit for said chamber;
    d. a valve mechanism for controlling into said outlet conduit and having a first setting for the reception by said outlet conduit of liquid from said inlet conduit, said valve mechanism having a second setting for reception of said outlet conduit of said air-vapor mixture; and e. a pressure-sensitive valve control means located within said chamber for normally maintaining said first setting of said valve mechanism, said control means providing said second setting of said valve mechanism when the pressure of said mixture reaches a predetermined level, said valve control means provide a resiliently supported member positioned in the path of movement of said air-vapor mixture, said resiliently supported member is a piston member, said piston member is mounted on said outlet conduit.

9. A valve in accordance with claim 8, in which said valve control means provide spring means for resiliently supporting said member.

10. A valve in accordance with claim 9, in which said spring means provide a spring surrounding said outlet conduit.

11. A valve in accordance with claim 10, in which said spring is a compression spring positioned between said resiliently supported member and an end wall of said housing.